United States Patent

Busing et al.

[15] 3,691,460
[45] Sept. 12, 1972

[54] APPARATUS FOR THE NOISE-COMPENSATED MEASUREMENT OF HIGH D.C. CURRENTS

[72] Inventors: Walter Busing, Bergisch-Gladbach/Schildgen; Wolfgang Gebauer, Leverkusen, both of Germany

[73] Assignee: Farbenfabriken Bayer Aktiengesellschaft, Leverkusen, Germany

[22] Filed: Oct. 7, 1970

[21] Appl. No.: 78,709

[30] Foreign Application Priority Data

Oct. 30, 1969 Germany..........P 19 54 635.1

[52] U.S. Cl.................................324/126, 307/93
[51] Int. Cl. ............................G01r 1/38, H02h 1/04
[58] Field of Search ........324/126, 127, 102; 307/89, 307/90, 91, 92, 93; 333/12; 328/165

[56] References Cited

FOREIGN PATENTS OR APPLICATIONS 1,216,981 5/1966 Germany....................324/126

Primary Examiner—Rudolph V. Rolinec
Assistant Examiner—Ernest F. Karlsen
Attorney—Burgess, Dinklage & Sprung

[57] ABSTRACT

The invention relates to an apparatus for measuring current intensity in a direct current circuit through which much current flows, e.g., electrolysis of sodium chloride, by measuring the voltage drop in a conductor included in the high current circuit. Noise would normally be generated in the measuring circuit by changes in the magnetic field surrounding the conductor as a result of changes in current flow in the conductor and this would cause errors in current measurement corresponding to said changes. Accordingly, a multi-turn coil is included in the measuring circuit and it is positioned in such a way that the voltage induced into the coil by changes of the magnetic field compensates the noise voltage induced into the other part of the measuring circuit. The exact magnitude of the voltage induced into the coil is controlled by a variable resistor so that it can be equated to said noise voltage.

4 Claims, 3 Drawing Figures

INVENTOR.:
WALTER BÜSING, WOLFGANG GEBAUER.
BY
Burgess, Dinklage & Sprung

APPARATUS FOR THE NOISE-COMPENSATED MEASUREMENT OF HIGH D.C. CURRENTS

The invention relates to an apparatus for measuring intensity of direct current in a circuit through which much current flows, as well as to such a process, e.g., electrolysis of aqueous sodium chloride solution, using such an apparatus for process control applications.

In known apparatus for measuring intensity of high d.c. currents in a circuit through which a large amount of current flows, such as used in electro-metallurgy or in electro-chemistry, it is known to employ shunts. By definition, a shunt is a constant resistance whose value is known and across whose terminals the fall in voltage caused by the direct current flowing therethrough is measured. Apart from the fact that shunts of this kind are extremely expensive, it is often found that inaccuracies in measurement can occur as a result of poor distribution of the current throughout the different resistance plates of the shunt which are usually made of manganin.

In addition, high direct currents can also be measured by means of a direct current instrument transformer (cf. for example Elektrotechnische Zeitschrift 58, page 1309, 1937). However, this measurement technique is also expensive and in addition has the disadvantage that d.c. transformers of this kind incorporate means for noise filtering. As a result, time delay occurs in the output signal and the flow of current as a function of time is not faithfully reproduced.

One very simple and well-known method of measuring extremely high direct currents of the kind that occur, for example, in electrolysis plants, is to determine the fall in voltage in a copper or aluminum rail through which direct current is flowing, by means of a d.c. voltmeter and to use it as a measure of the current on the basis of Ohm's law.

The general equation of Ohm's law:

$$I = E/R$$

where
 $I$ is electric current,
 $R$ is resistance, and
 $E$ is electric voltage or potential, can be applied to a straight conductor rail of uniform cross-section which is long enough in relation to its cross-section that the current is uniformly distributed therethrough. The resistance $R$ of the conductor rail between the voltage taps can be calculated, for example, from the specific resistance of the conductor material and the dimensions of the conductor rail. Since the specific resistance is governed by temperature, the mean temperature of the conductor rail also has to be taken into consideration. Unfortunately, some uncertainty is always involved in determining these various factors, considerably limiting the accuracy of this particular method of measurement. Accordingly, it is applied in cases where accuracy does not have to satisfy stringent requirements.

In special cases of high current measurement, for example in connection with the monitoring of electrolysis plants for electrode short circuits, it is most desirable to achieve a measuring signal the accuracy of which is not affected by changes of current flow. In this cases, a medium-grade accuracy of the absolute value measured may be tolerated rather than any time delay involved in the method of measurement.

The invention relates to an improvement of the above mentioned method of voltage drop measurement, making it suitable for said applications.

The invention and its background will be described with reference to the accompanying drawing, wherein.

Figures 1, 2, 3:
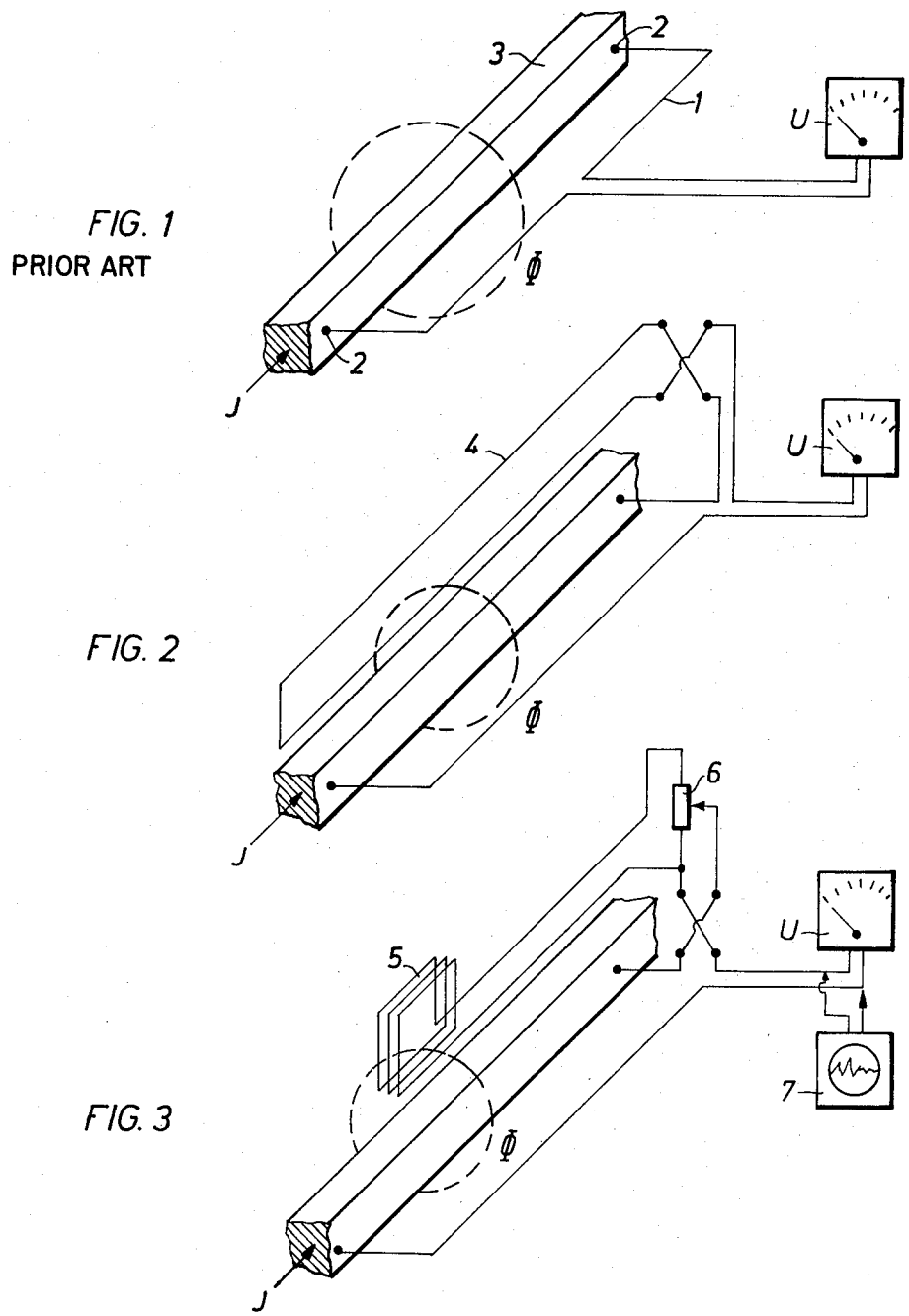
FIG. 1 is a schematic illustration of a known measuring system.
FIG. 2 is a schematic illustration of a system embodying the principle of the present invention.
FIG. 3 is a schematic illustration of a measuring system in accordance with a preferred embodiment of the invention.

Since the conductor rail used to measure the fall in voltage is surrounded by a strong magnetic field proportional to the electrolysis current, noise of the following intensity:

$$E = d\Phi/dt$$

is produced in the conductor loop formed by the measuring circuit in the event of any change in current intensity and field strength, $\Phi$ being the magnetic flow through the conductor loop shown in FIG. 1. By advantageously arranging the leads 1 to the voltage taps 2 on the conductor rail 3, the size of the loop through which the magnetic field passes can be reduced. As a rule, however, it is not possible to adequately suppress the noise produced in the measuring circuit in this way.

An apparatus for measuring high direct currents, with the aid of a fall in voltage across a current-carrying conductor, has now been found in which the noise induced in the measuring circuit in the event of any changes in current is eliminated by providing a compensating voltage of the same value but of opposite sign, the compensating voltage being obtained by means of a conductor loop arranged in such a way that the magnetic field of the current-carrying conductor flows through it in the same direction as it flows through the conductor loop formed by the measuring circuit.

By including the second conductor loop in the measuring circuit in accordance with the invention, the effects of the two induced voltage components cancel one another out.

FIG. 1 illustrates a simple measuring apparatus without a compensating circuit, comprising a conductor rail 3, through which current flows in the direction indicated by the arrow, voltage taps 2, the lead 1 and a d.c. voltmeter U. In FIG. 2, the reference 4 denotes a second conductor loop, and FIG. 3 shows a measuring arrangement comprising a coil 5, a high-resistance voltage divider 6 and a cathode ray oscillograph 7.

In the special embodiment shown in FIG. 3, a coil 5 of several windings is used to generate the compensating voltage. According to the number of windings, a coil of this kind can be considerably smaller than a conductor loop with only one winding. In order to facilitate adjustment to the minimum residual noise level, it has also proved to be of advantage to increase the size or number of windings of the compensating coil beyond the value required and to effect adjustment with a sufficiently high-resistance voltage divider 6. It has also proved to be of advantage to use a cathode ray oscillograph 7 as a means of visually displaying the result of this adjustment. The harmonics content which is always present in practical operation, for example in electrolysis direct current and hence in the magnetic field of the conductor rail, generates a noise component both in the measuring loop and also in the compensating coil which enables adjustment to the minimum noise level to be effected at any time. In other words, there is no need for this purpose to effect any changes in load or other measures for producing intentional fluctuations in current intensity that are usually undesirable from the point of view of operation.

The apparatus described in the foregoing is eminently suitable for monitoring installations in which extremely high direct currents flow such as chemical reactors, for example, in electrolysis installations, especially those used for the electrolysis of alkali metal chlorides such as sodium chloride, and in electrolytic processes in which there is a considerable danger of short circuits in view of the short distance between the electrodes.

For example, in a plant for electrolysing aqueous solutions of sodium chloride wherein a copper rail is provided in the circuit, the current flow through the rail is normally 100,000 amperes. Taps are taken at a distance of 400 inches from one another, one of the taps being connected by a lead directly to a voltmeter. The other tap is connected to a coil having 10 turns, the coil in turn being connected to a variable resistor which is connected parallel to the same tap as shown in FIG. 3; an adjustable member, subdividing the voltage drop across the loop, extends from the resistor to the other terminal of the voltmeter. An oscillograph is positioned in parallel with the voltmeter and the adjustable element is moved along the resistor until the pattern on the oscillograph is reduced as closely as possible to a straight line. Thereafter the accuracy of the measuring signal is unaffected by current flow changes, enabling true indication of the momentary current intensity. For instance, this measuring signal is suitable to be fed into an automatic short circuit detecting system for electrolytic cells, therein preventing interactions caused by load changes.

It will be appreciated that the instant specification and examples are set forth by way of illustration and not limitation and that various modifications and changes may be made without departing from the spirit and scope of the present invention.

What is claimed is:

1. In an apparatus for measuring the intensity of the flow of direct current in a circuit through which a large amount of current flows, by means of a fall in the voltage in a current-carrying conductor, said apparatus comprising a measuring circuit including a portion of said current-carrying conductor, a meter for measuring the voltage across said portion of said current-carrying conductor and means connecting the meter to the current carrying conductor, the improvement which comprises providing the connecting means with a conductor loop positioned adjacent said current-carrying conductor so that the voltage induced into said conductor loop by changes of the magnetic field surrounding said current-carrying conductor is of the same value but opposite direction from the noise voltage induced into the measuring circuit by the same changes of said magnetic field, whereby there is eliminated the noise which would otherwise be induced upon a change in current flow in the measuring circuit.

2. An apparatus according to claim 1, wherein said conductor loop comprises a coil of several turns.

3. An apparatus according to claim 2, wherein the characteristic of said conductor loop is such that the compensating voltage which it is capable of generating is greater than the said noise voltage, the measuring circuit including a variable resistance across said loop and an adjustable tap for controlling the amount of the excessive compensating voltage which takes place across said loop, thereby to equate said controlled amount with said noise voltage drop across said portion of the current-carrying conductor.

4. An apparatus according to claim 3, including a cathode ray oscillograph in said measuring circuit whereby adjustment of the compensating voltage can be effected visually.

* * * * *